(12) United States Patent
Fukae

(10) Patent No.: US 10,992,169 B2
(45) Date of Patent: Apr. 27, 2021

(54) VEHICLE-MOUNTED BACKUP DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Kazushi Fukae, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 93 days.

(21) Appl. No.: 16/341,144

(22) PCT Filed: Sep. 25, 2017

(86) PCT No.: PCT/JP2017/034548
§ 371 (c)(1),
(2) Date: Apr. 11, 2019

(87) PCT Pub. No.: WO2018/070231
PCT Pub. Date: Apr. 19, 2018

(65) Prior Publication Data
US 2020/0259363 A1 Aug. 13, 2020

(30) Foreign Application Priority Data

Oct. 14, 2016 (JP) .............................. JP2016-202273

(51) Int. Cl.
*H02J 9/06* (2006.01)
*H02J 7/00* (2006.01)
*B60R 16/033* (2006.01)

(52) U.S. Cl.
CPC .............. *H02J 9/06* (2013.01); *B60R 16/033* (2013.01); *H02J 7/0068* (2013.01); *H02J 7/007182* (2020.01)

(58) Field of Classification Search
CPC .......... H02J 9/06; H02J 7/007182; H02J 7/14; H02J 7/0068; H02J 7/0013; B60R 16/033; B60K 1/04; G01R 31/36
(Continued)

(56) References Cited

U.S. PATENT DOCUMENTS

2008/0150483 A1* 6/2008 Morita .................... H02J 9/061
320/122
2011/0140518 A1* 6/2011 Hattori .................. H02J 7/1423
307/9.1

(Continued)

FOREIGN PATENT DOCUMENTS

JP 2002-064949 A 2/2002
JP 2009-225530 A 10/2009

OTHER PUBLICATIONS

International Search Report, Application No. PCT/JP2017/034548, dated Dec. 12, 2017. ISA/Japan Patent Office.

*Primary Examiner* — Daniel J Cavallari
*Assistant Examiner* — Brian K Baxter
(74) *Attorney, Agent, or Firm* — Honigman LLP

(57) ABSTRACT

A device capable of switching the supply source to a power storage unit without interrupting power supply to a power supply target even in the case where power supply from a power source unit cuts out is realized with a simple configuration. A backup device includes a discharging circuit that steps up or steps down a voltage applied to a power storage unit-side conduction path and applies the resulting voltage to an output-side conduction path, a control unit (5) that controls the discharging circuit to apply, to the output-side conduction path, a predetermined target voltage that is
(Continued)

lower than a voltage that is applied to a power path in the case where a power source unit is fully charged, and a diode (element unit) that is provided between the power path and the output-side conduction path.

4 Claims, 3 Drawing Sheets

(58) Field of Classification Search
USPC .................................................. 307/10.1
See application file for complete search history.

(56) References Cited

U.S. PATENT DOCUMENTS

| | | | |
|---|---|---|---|
| 2011/0156482 A1* | 6/2011 | Yang | H02J 9/06 307/66 |
| 2012/0032505 A1* | 2/2012 | Kusumi | B60L 50/61 307/10.1 |
| 2012/0235490 A1* | 9/2012 | Lee | H02J 9/005 307/66 |
| 2013/0009466 A1* | 1/2013 | Kumagai | H02M 3/04 307/10.1 |
| 2013/0110337 A1* | 5/2013 | Kondoh | B60L 15/00 701/22 |
| 2015/0001926 A1* | 1/2015 | Kageyama | E05B 81/86 307/10.1 |
| 2015/0291111 A1* | 10/2015 | Suzuki | B60R 16/033 307/10.1 |
| 2015/0336523 A1* | 11/2015 | Okaniwa | B60L 58/10 307/10.6 |
| 2019/0103758 A1* | 4/2019 | Fukae | B60R 16/03 |
| 2019/0168634 A1* | 6/2019 | Teng | B60L 50/60 |
| 2019/0232902 A1* | 8/2019 | Teng | B60T 17/22 |

* cited by examiner

VEHICLE-MOUNTED BACKUP DEVICE

CROSS-REFERENCE TO RELATED APPLICATIONS

This application is the U.S. national stage of PCT/JP2017/034548 filed Sep. 25, 2017, which claims priority of Japanese Patent Application No. JP 2016-202273 filed Oct. 14, 2016, the contents of which are incorporated herein.

TECHNICAL FIELD

The present disclosure relates to a vehicle-mounted backup device.

BACKGROUND

As a vehicle-mounted power source system, a technology is known in which a voltage adjusted with a step-up/down circuit based on the output voltage of a capacitor serving as a power storage unit is applied to a load in the case where a failure or the like arises in a battery serving as a power source unit. With this system, since the voltage adjusted with the step-up/down circuit based on the output voltage of the capacitor will be applied to the load after detecting that the battery has failed, there is a risk that the voltage applied to the load will be interrupted for a brief period. In order to solve this problem, in JP 5618024, a smoothing capacitor is provided in a step-up circuit. In JP 5618024, after the battery fails, the stored output voltage of the smoothing capacitor can thereby be applied to the load for the period until the output voltage of the capacitor is adjusted with the step-up circuit and applied to the load.

However, in the case of using only the method of the system disclosed in JP 5618024, a large-capacity smoothing capacitor needs to be provided if the power consumption of the load serving as the power supply target is high, thus necessitating the provision of a plurality of smoothing capacitors or the provision of a large-scale smoothing capacitor. Thus, in the case of using only the configuration of the system disclosed in JP 5618024, an increase in circuit size tends to result if the power consumption of the load is high, with this problem becoming more pronounced as power consumption increases.

The present disclosure has been made under the above-mentioned circumstances, and an object thereof is to realize, with a simple configuration, a device capable of switching the supply source to a power storage unit without interrupting power supply to a power supply target even in the case where power supply from a power source unit cuts out.

SUMMARY

The present disclosure is a backup device in a vehicle-mounted power source system that includes a power source unit configured to supply power to a power supply target, a power path serving as a path for supplying power from the power source unit to the power supply target, and a power storage unit serving as a power supply source at least when power supply from the power source unit cuts out. The backup device includes a discharging circuit configured to step-up or step-down a voltage applied to a power storage unit-side conduction path serving as a discharging path from the power storage unit and apply a resulting voltage to an output-side conduction path. A charging circuit is configured to charge the power storage unit based on power that is supplied from the power source unit. A control unit is configured to control the discharging circuit to apply, to the output-side conduction path, a predetermined target voltage that is lower than a voltage that is applied to the power path when the power source unit is fully charged. An element unit is provided between the power path and the output-side conduction path, and configured to restrict flow of current from the output-side conduction path to the power path in a case where the voltage of the output-side conduction path is lower than the voltage of the power path, and to allow flow of current from the output-side conduction path to the power path side in a case where the voltage of the output-side conduction path is higher than the voltage of the power path. The control unit causes the charging circuit to perform a charging operation for charging the power storage unit in response to a predetermined charge start condition being established, and causes the discharging circuit to perform voltage conversion such that the target voltage is applied to the output-side conduction path in a case where an output voltage of the power storage unit is equal to or greater than a predetermined first threshold, and stops the charging operation of the charging circuit in a case where the output voltage of the power storage unit reaches a second threshold that is higher than the first threshold, and stops the charging operation of the charging circuit in a case where the voltage of a wiring part that is electrically connected to the power source unit and disposed between the power source unit and the power path becomes equal to or less than a predetermined threshold.

Advantageous Effects of Disclosure

With this backup device, when the power source unit is in the fully charged state or in a normal state approaching the fully charged state, the voltage that is applied to the output-side conduction path by the discharging circuit is lower than the voltage that is applied to the power path, and thus current is restricted by the element unit, and current does not flow from the output-side conduction path to the power path. Accordingly, discharge from the power storage unit can be suppressed when the power source unit is in the fully charged state or in a normal state approaching the fully charged state. On the other hand, in the case where power supply to the power path from the power source unit drops or stops for some reason and the voltage applied to the output-side conduction path by the discharging circuit becomes higher than the voltage applied to the power path, current flows from the output-side conduction path to the power path side. Therefore, even when a situation such as power supply to the power path from the power source unit dropping or stopping occurs, current that is based on the output of the power storage unit can be immediately sent to the power path via the output-side conduction path, and backup can be implemented very quickly. Moreover, even when the output voltage of the power storage unit drops to some extent at the time of an anomaly on the power path, a desired voltage can be immediately applied to the power path as long as the voltage that is applied to the output-side conduction path under the control of the control unit can be maintained at a target voltage.

In this way, a device capable of switching the supply source to a power storage unit without interrupting power supply to a power supply target even in the case where power supply from a power source unit cuts out can be realized with a simple configuration.

Also, the backup device constituted in this way is able to start voltage conversion by the discharging circuit and enter a standby state (i.e., state in which backup can be implemented when power supply to the power path from the power source unit drops or stops) even during the charging operation by the charging circuit (before the output voltage reaches the second threshold) as long as the output voltage of the power storage unit is equal to or greater than the first threshold. In other words, since the backup device is able to enter the standby state at an early stage, the period for which backup is not implementable can be reduced.

DETAILED DESCRIPTION OF PREFERRED EMBODIMENTS

Herein, desirable examples of the present disclosure will be shown. However, the present disclosure is not limited to the following examples.

In a backup device of the present disclosure, an element unit may include a diode electrically connected, at an anode, to an output-side conduction path, and electrically connected, at a cathode, to a power path.

With the backup device constituted in this way, when a power source unit is in the fully charged state or in a normal state approaching the fully charged state, the voltage that is applied to the output-side conduction path by a discharging circuit (i.e., anode-side voltage of the diode) is lower than the voltage that is applied to the power path (i.e., cathode-side voltage of the diode), and thus flow of current to the power path from the output-side conduction path can be restricted. Also, in the case where power supply to the power path from the power source unit drops or stops for some reason and the voltage that is applied to the output-side conduction path by the discharging circuit (anode-side voltage of the diode) becomes higher than the voltage that is applied to the power path (cathode-side voltage of the diode), current can be immediately sent from the output-side conduction path to the power path via the diode. Also, such a function can be easily realized mainly through the action of the diode.

Hereinafter, embodiments of the present disclosure will be described.

First Embodiment

Figure 1:
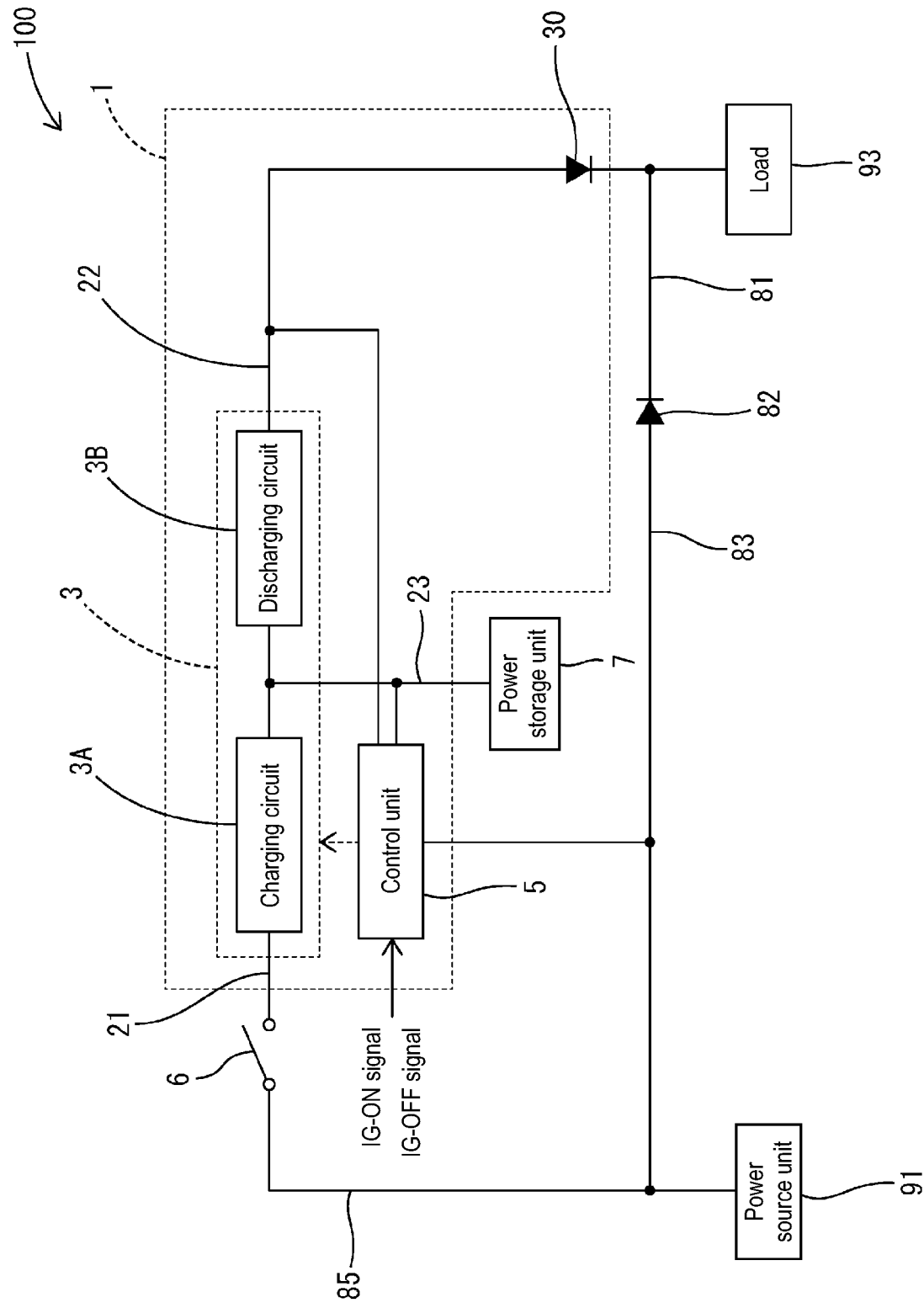
FIG. 1 is a circuit diagram schematically showing a vehicle-mounted power source system provided with a backup device of a first embodiment.

FIG. 1 shows a block diagram of a vehicle-mounted power source system 100 provided with a vehicle-mounted backup device 1 according to a first embodiment. The vehicle-mounted power source system 100 has a power source unit 91 serving as a main power source for supplying power to a load 93 (power supply target), a power storage unit 7 serving as a power supply source at least when power supply from the power source unit 91 cuts out, and the backup device 1 provided with a function of quickly performing discharge from the power storage unit 7 when power supply from the power source unit 91 cuts out, and is constituted as a system that supplies power to the load 93 with the power source unit 91 or the power storage unit 7 as the power supply source.

This vehicle-mounted power source system 100 is configured to apply a voltage that is based on the output voltage of the power source unit 91 to a power path 81 that is constituted as a wiring part and supply power from the power source unit 91 to the load 93 (power supply target) via the power path 81, when power supply from the power source unit 91 is in a normal state. "When power supply from the power source unit 91 is in a normal state" refers to the case where the output voltage of the power source unit 91 exceeds a predetermined value, and to the case where the voltage (potential) of the power path 81 exceeds a predetermined threshold voltage; specifically, the case where a value V2−Vf obtained by subtracting a forward voltage Vf of a diode 30 from a target voltage V2 described later is lower than a voltage V1 that is applied to the power path 81 based on the output voltage of the power source unit 91 (voltage applied to the power path 81 based on power that is supplied from the power source unit 91 via a wiring part 83 and a diode 82).

The power source unit 91 is a vehicle-mounted power source that can supply power to the load 93 (power supply target), and is constituted as a well-known in-vehicle battery such as a lead battery, for example. The power source unit 91 is electrically connected, at the terminal on the high potential side, to a wiring part 85 and the wiring part 83, and applies a predetermined output voltage (henceforth, also referred to as +B voltage) to the wiring part 85 and the wiring part 83.

The power path 81 is part of the path that supplies power from the power source unit 91 to the load 93 (power supply target). The power path 81 is a path that guides power that is supplied from the power source unit 91 via the wiring part 83 and the diode 82 to the load 93.

The wiring part 83 is provided between the power source unit 91 and the power path 81, and is constituted as a path to which the output voltage of the power source unit 91 is applied. The diode 82 is provided between the wiring part 83 and the power path 81, with the anode of the diode 82 being electrically connected to the power source unit 91 via the wiring part 83, and the cathode being electrically connected to the power path 81. This diode 82 allows flow of current to the power path 81 side from the power source unit 91 and blocks flow of current to the power source unit 91 side from the power path 81. For example, even when an anomaly such as a ground fault arises in the wiring part 83, current is prevented from flowing to the wiring part 83 side from the power path 81.

The power storage unit 7 is constituted by a well-known power storage means such as an electric double-layer capacitor (EDLC), for example. The power storage unit 7 is electrically connected to a charging and discharging circuit unit 3, and charging or discharging is carried out by the charging and discharging circuit unit 3. The output voltage of the power storage unit 7 when fully charged may be higher than or may be lower than the output voltage of the power source unit 91 when fully charged.

The load 93 corresponds to an example of a power supply target, and is constituted as a well-known vehicle-mounted electrical component. The load 93 is, as a preferred example, an electrical component to which power is desirably supplied even in the case where the power source unit 91 fails, such as an ECU or actuator in a shift-by-wire system, for example. The load 93, at the time of the abovementioned normal state, operates based on power that is supplied from the power source unit 91, and, at the time of an anomalous state, operates based on power that is supplied from the power storage unit 7.

An IG relay 6 is a relay that switches to an ON state in the case where a predetermined start operation (ignition-ON operation (IG-ON operation)) for starting the engine is carried out on an operation unit (not shown) provided in the vehicle, and switches to an OFF state in the case where a predetermined stop operation (ignition-OFF operation (IG-OFF operation)) for stopping the engine is carried out. This IG relay 6 enters an energized state when in the ON state, and electrically connects the wiring part 85 and the charging circuit-side conduction path 21. Due to the ON operation of such an IG relay 6, the power source voltage (+B voltage) of the power source unit 91 is supplied to the charging circuit-side conduction path 21. The IG relay 6 enters a de-energized state when in the OFF state, and, at this time, the power source voltage (+B voltage) applied to the wiring part 85 is not supplied to the charging circuit-side conduction path 21. Note that, in the following description, the power source voltage that is applied to the charging circuit-side conduction path 21 via the IG relay 6 is also called an IG voltage.

The backup device 1 is mainly provided with a charging circuit-side conduction path 21, an output-side conduction path (discharging circuit-side conduction path) 22, a power storage unit-side conduction path 23, the charging and discharging circuit unit 3, the diode 30 (element unit), a control unit 5, and the like.

The charging circuit-side conduction path 21 is disposed between one end side of the ignition relay 6 (hereinafter, IG relay 6) and a charging circuit 3A, and serves as an input-side conduction path to the charging circuit 3A. The charging circuit-side conduction path 21 is electrically connected to the wiring part 85 at the time of ON-operation of the ignition relay 6 (at the time of an electrical connection operation).

The output-side conduction path 22 is a conduction path through which the output voltage of a discharging circuit 3B is applied, and is a conduction path that serves as a path for when sending current from the discharging circuit 3B to the power path 81. The output-side conduction path 22 is electrically connected, at one end side, to the output side of the discharging circuit 3B, and is electrically connected, at the other end side, to the anode of the diode 30.

The power storage unit-side conduction path 23 is a conduction path serving as a charging path to the power storage unit 7 from the charging circuit 3A, and as an input path (discharging path) to the discharging circuit 3B from the power storage unit 7. The power storage unit-side conduction path 23 is electrically connected to the high potential-side terminal of the power storage unit 7, and is electrically connected to both the output side of the charging circuit 3A and the input side of the discharging circuit 3B.

The diode 30 corresponds to an example of an element unit, and is provided between the power path 81 and the output-side conduction path 22. The diode 30 (element unit) is electrically connected, at the anode, to the output-side conduction path 22, and is electrically connected, at the cathode, to the power path 81. This diode 30 operates to restrict flow of current from the output-side conduction path 22 to the power path 81 at least in the case where the voltage (potential) of the output-side conduction path 22 is lower than the voltage (potential) of the power path 81, and to allow flow of current from the output-side conduction path 22 to the power path 81 side in the case where the voltage (potential) of the output-side conduction path 22 is higher than the voltage (potential) of the power path 81. Specifically, current is sent from the output-side conduction path 22 to the power path 81 in the case where the potential of the output-side conduction path 22 becomes higher than the potential of the power path 81 and the potential difference therebetween becomes higher than the forward voltage Vf of the diode 30.

The charging and discharging circuit unit 3 has the charging circuit 3A and the discharging circuit 3B, and can perform a charging operation for charging the power storage unit 7 based on power from the power source unit 91 and a discharging operation for discharging the power storage unit 7. The charging operation by the charging circuit 3A is controlled by the control unit 5, and the discharging operation by the discharging circuit 3B is also controlled by the control unit 5.

The charging circuit 3A is a circuit that charges the power storage unit 7 based on power that is supplied from the power source unit 91, and is, for example, constituted as a well-known charging circuit such as a step-up, step-down or step-up/down DC-DC converter. A charge instruction signal that instructs charging of the power storage unit 7 or a charge stop signal that instructs stopping charging of the power storage unit 7 is given to the charging circuit 3A by the control unit 5. The charging circuit 3A performs a voltage conversion operation for stepping up or stepping down the power source voltage that is input from the power source unit 91 via the charging circuit-side conduction path 21 when the charge instruction signal is being given to the charging circuit 3A by the control unit 5, and applies the converted voltage to the power storage unit 7 via the power storage unit-side conduction path 23. When the charge stop signal is being given to the charging circuit 3A by the control unit 5, the charging circuit 3A does not perform the charging operation, and, at this time, the charging circuit-side conduction path 21 and the power storage unit-side conduction path 23 enter an electrically disconnected state.

The discharging circuit 3B is provided between the power storage unit 7 and the power path 81 (specifically, between the power storage unit-side conduction path 23 and the output-side conduction path 22), and can perform a discharging operation for discharging the power storage unit 7, and a discharge stop operation for stopping discharging of the power storage unit 7. The discharging circuit 3B is constituted as a well-known discharging circuit such as a step-up, step-down or step-up/down DC-DC converter, for example. This discharging circuit 3B performs a discharging operation for applying a set target voltage to the output-side conduction path 22, based on the input voltage applied to the power storage unit-side conduction path 23 (output voltage from the power storage unit 7), in the case where a discharge instruction signal is being given by the control unit 5, and stops this discharging operation and maintains the electrically disconnected state between the power storage unit-side conduction path 23 and the output-side conduction path 22, in the case where a discharge stop signal is being given by the control unit 5.

The control unit 5 is constituted as a microcomputer or the like, for example, and has a computation unit such as a CPU, a memory such as a ROM or a RAM, an A/D converter, and the like. The voltage of the wiring part 83 (i.e., output voltage value of the power source unit 91) is input to the control unit 5, and the control unit 5 is configured to be able to continuously monitor the voltage (potential) of the wiring part 83. Note that the configuration shown in FIG. 1 is intended to be illustrative in all respects, and the control unit 5 need only be able to detect the output voltage of the power source unit 91, and may monitor the voltage of another location as long as that location is on a path electrically connected to the power source unit 91. Also, the configuration for inputting a value indicating the voltage of the path electrically connected to the power source unit 91 to the control unit 5 may be a configuration in which the voltage of the path is input to the control unit 5 directly as shown in FIG. 1, or a voltage obtained by dividing the voltage of the path using a voltage dividing circuit or the like may be input to the control unit 5.

The voltage of the output-side conduction path 22 (i.e., output voltage value of the discharging circuit 3B) is input to the control unit 5, and the control unit 5 is configured to be able to continuously monitor the voltage (potential) of the output-side conduction path 22. Furthermore, the voltage of the power storage unit-side conduction path 23 (i.e., output voltage value of the power storage unit 7) is input to the control unit 5, and the control unit 5 is configured to be able to continuously monitor the voltage (potential) of the power storage unit-side conduction path 23. Similarly, in this case, the control unit 5 need only be able to grasp the respective voltages of the output-side conduction path 22 and the power storage unit-side conduction path 23, and a configuration may be adopted in which the voltages of the respective paths are input to the control unit 5 directly, or a configuration may be adopted in which voltages obtained by dividing the voltages of the respective paths using a voltage dividing circuit or the like are input to the control unit 5.

The control unit 5 is able to control the charging operation and discharging operation by the charging and discharging circuit unit 3. Specifically, the control unit 5 is able to give the charge instruction signal or the charge stop signal to the charging circuit 3A, and is able to give the discharge instruction signal or the discharge stop signal to the discharging circuit 3B.

Next, charging control that is performed with the backup device 1 will be described mainly with reference to FIG. 2.

Figure 2:
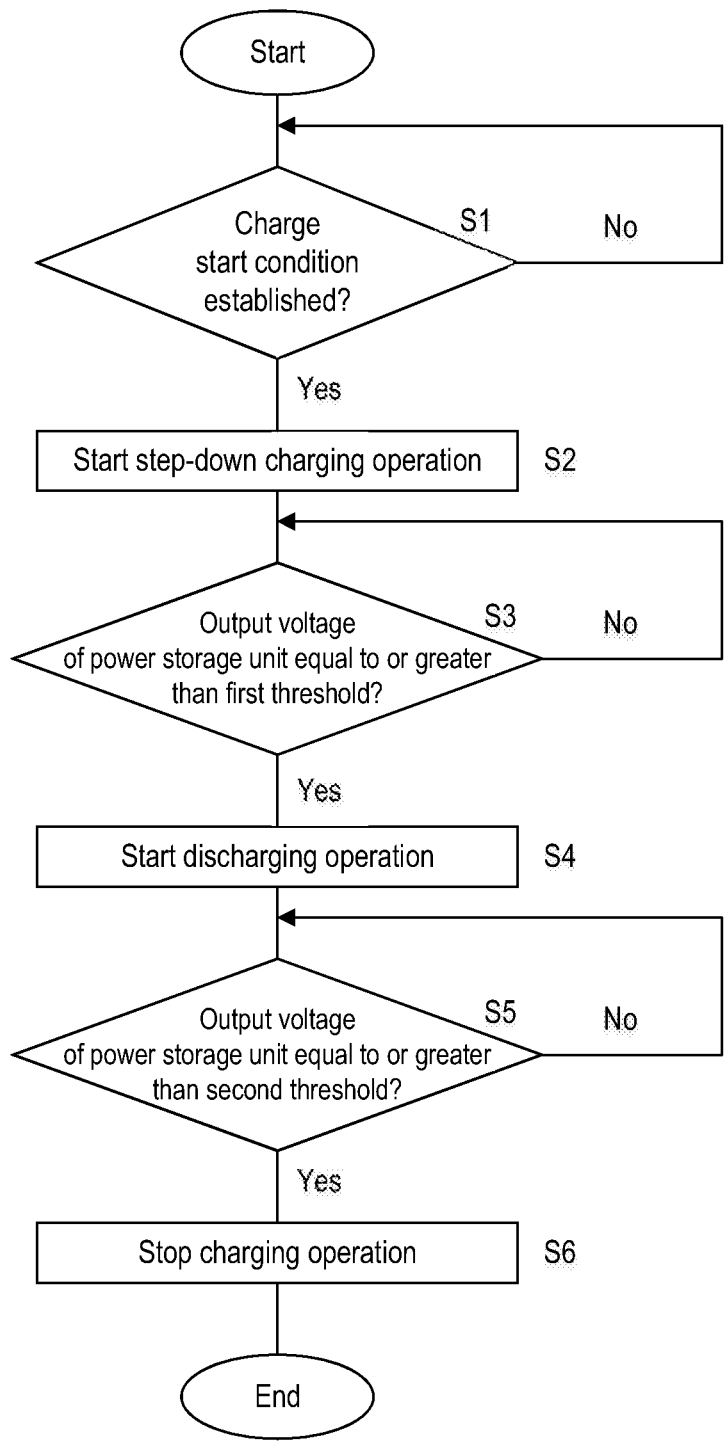
FIG. 2 is a flowchart illustrating the flow of charging control that is performed with the backup device of the first embodiment.

The control shown in FIG. 2 is control that is executed by the control unit 5. The control unit 5 is, for example, configured to be able to receive power supply from the power source unit 91 and the power storage unit 7, and executes the control of FIG. 2 continuously during the period in which power supply is being received. Note that, in the following description, an example in which the output voltage of the power source unit 91 when fully charged is higher than the output voltage of the power storage unit 7 when fully charged is illustrated.

The control unit 5 starts the control shown in FIG. 2, in the case where the control unit 5 is powered on or in the case where the control of FIG. 2 ends, and first stands by until a predetermined charge start condition is established (step S1). In the following example, "switching of the ignition switch from an OFF state to an ON state" is given as the predetermined charge start condition, and the control unit 5, in the case where it is judged that the signal that is input to the control unit 5 from outside has switched from an ignition-OFF signal (IG-OFF signal) to an ignition-ON signal (IG-ON signal) after starting the control of FIG. 2 (Yes in step S1), starts control for causing the charging circuit 3A to perform a step-down charging operation in step S2. Note that the judgment of step S1 is repeated for the duration that the signal that is input to the control unit 5 from outside is judged to be the ignition-OFF signal (IG-OFF signal), after starting the control of FIG. 2.

With this configuration, when an IG-ON operation (ON operation for turning on the ignition switch) is carried out within the vehicle in which the vehicle-mounted power source system 100 is mounted, the IG relay 6 switches from the OFF state to the ON state, and the wiring part 85 and the charging circuit-side conduction path 21 are electrically connected. The IG voltage is thereby applied to the backup device 1. Also, with this configuration, when the IG relay 6 is in the OFF state, the IG-OFF signal will be input to the control unit 5 by an external device or the like that is not illustrated, and, when the IG relay 6 is in the ON state, the IG-ON signal will be input to the control unit 5.

The control unit 5, in the case of having caused the charging circuit 3A to start the step-down charging operation in step S2, gives the charge instruction signal to the charging circuit 3A, and causes the charging circuit 3A to perform the charging operation. Specifically, the control unit 5 causes the charging circuit 3A provided with the function of a step-down converter to perform a step-down operation, such that the output voltage of the charging circuit 3A achieves a target voltage value that is lower than the output voltage (e.g., 12 V) of the power source unit 91 at full charge and slightly higher than a second threshold (threshold serving as an indication that charging is completed) described later, for example. For the duration that the charge instruction signal is being given to the charging circuit 3A by the control unit 5 in this way, the step-down operation is continued by the charging circuit 3A such that the above target voltage value is output, and the power storage unit 7 is charged by the output current resulting from this step-down operation.

The control unit 5 continuously monitors the output voltage of the power storage unit 7, after starting the step-down charging operation in step S2. The control unit 5 then judges whether the output voltage of the power storage unit 7 is equal to or greater than a predetermined first threshold. If the output voltage of the power storage unit 7 is less than the first threshold (if No in step S3), the judgment of step S3 is repeated. In other words, the control unit 5 repeats the judgment of step S3 while continuously monitoring the output voltage of the power storage unit 7, until the output voltage of the power storage unit 7 becomes equal to or greater than the first threshold, and, if the output voltage of the power storage unit 7 becomes equal to or greater than the first threshold (if Yes in step S3), causes the discharging circuit 3B to start the discharging operation in step S4. Note that the first threshold is lower than the second threshold determined as an indication that the power storage unit 7 is fully charged, and is equal to or greater than the minimum input voltage value required in order for the discharging circuit 3B to output a target voltage determined in advance.

The control unit 5, in the case of having caused the discharging circuit 3B to start the discharging operation in step S4, gives the discharge instruction signal to the discharging circuit 3B, and controls the discharging circuit 3B to apply a target voltage having a predetermined value to the output-side conduction path 22. The value of the target voltage is, for example, lower than the voltage (potential) that is applied to the power path 81 when the power source unit 91 is fully charged, and higher than the above second threshold. The discharging circuit 3B performs the discharging operation when the discharge instruction signal is being received from the control unit 5, and steps up the voltage applied to the power storage unit-side conduction path 23 and applies the resulting voltage to the output-side conduction path 22. Note that the control unit 5 executes control for causing the discharging circuit 3B to perform the discharging operation in this way, until the IG-OFF signal is input to the control unit 5 (i.e., until the ignition switch in the ON state is switched to the OFF state), for example.

The control unit 5 continuously monitors the output voltage of the power storage unit 7 even after the discharging operation is started in step S4. Also, the control unit 5 continues the charge instruction signal to the charging circuit 3A even after the discharging operation is started in step S4, and continues to cause the charging circuit 3A to perform the charging operation. After step S4, the control unit 5 judges whether the output voltage of the power storage unit 7 is equal to or greater than a predetermined second threshold. If the output voltage of the power storage unit 7 is less than the second threshold (if No in step S5), the judgment of step S5 is repeated. In other words, the control unit 5 repeats the judgment of step S5 while continuously monitoring the output voltage of the power storage unit 7, until the output voltage of the power storage unit 7 becomes equal to or greater than the second threshold, and, if the output voltage of the power storage unit 7 becomes equal to or greater than the second threshold (if Yes in step S5), causes the charging circuit 3A to stop the charging operation in step S6. Note that the second threshold is higher than the abovementioned first threshold, and, in this example, is lower than the output voltage of the power source unit 91 when fully charged.

In this way, the control unit 5 causes the charging circuit 3A to perform the charging operation for charging the power storage unit 7 from step S2 onward, in response a predetermined charge start condition (in the abovementioned example, the condition that the signal that is input to the control unit 5 switches from the IG-OFF signal to the IG-ON signal) being established, causes the discharging circuit 3B to perform voltage conversion such that a target voltage determined in advance is applied to the output-side conduction path 22 from step S4 onward, in the case where the output voltage of the power storage unit 7 is equal to or greater than the predetermined first threshold, and stops the charging operation of the charging circuit 3A in step S6, in the case where the output voltage of the power storage unit 7 reaches the second threshold that is higher than the first threshold.

Here, the case where power supply from the power source unit 91 is in the normal state will be described. Power supply from the power source unit 91 can be said to be normal, as long as the voltage V1 that is applied to the power path 81 based on the output voltage of the power source unit 91 (voltage that is applied to the power path 81 based on power that is supplied from the power source unit 91 via the wiring part 83 and the diode 82) is higher than the value V2−Vf obtained by subtracting the forward voltage Vf of the diode 30 from the target voltage V2, in the case where the ignition switch is in the ON state (in the case where the IG relay 6 is in the ON state and the IG-ON signal is being input to the control unit 5). The control unit 5 determines a threshold Vth that is used in anomaly determination at a value that is slightly higher than this value V2−Vf (specifically, higher than V2) and lower than the output voltage of the power source unit 91 when fully charged. The control unit 5 then monitors the voltage of the wiring part 83 continuously when the IG-ON signal is being input, and, in the case where the voltage of the wiring part 83 is higher than the threshold Vth, judges that power supply from the power source unit 91 is in the normal state.

In this way, as long as power supply from the power source unit 91 is in the normal state and the output voltage of the power source unit 91 that is applied to the wiring part 83 is higher than the threshold Vth, the voltage V1 of the power path 81 will be higher than the value V2−Vf obtained by subtracting the forward voltage Vf of the diode 30 from the target voltage V2 (voltage that is applied to the output-side conduction path 22 by the discharging circuit 3B), and thus current does not flow from the output-side conduction path 22 to the power path 81 even when the discharging circuit 3B is performing the discharging operation.

Next, operations in the case where power supply changes from the normal state to an anomalous state when the ignition switch is in the ON state will be described.

When an anomaly occurs in power supply from the power source unit 91 (e.g., occurrence of ground fault, disconnection, etc. in the vicinity of the power source unit 91) with the ignition switch in the ON state (i.e., with the IG relay 6 in the ON state), and the normal voltage is no longer applied to the wiring part 83 from the power source unit 91, the voltage (+B voltage) applied to the wiring part 83 changes from a value higher than the threshold Vth to a value equal to or less than the threshold Vth. The control unit 5 continuously monitors the voltage of the wiring part 83 when the ignition switch is in the ON state, and, in the case where the voltage of the wiring part becomes equal to or less than the threshold Vth, judges that power supply from the power source unit 91 is an anomalous state and places the charging circuit 3A in a stopped state. For example, when the charging circuit 3A is being caused to perform the charging operation, the control unit 5 stops the operation of the charging circuit 3A.

In this way, when the voltage of the wiring part 83 drops to equal to or less than the threshold Vth and the voltage of the power path 81 becomes lower than the value (V2−Vf) obtained by subtracting the forward voltage Vf of the diode 30 from the target voltage V2, current flows from the output-side conduction path 22 to the power path 81 as soon as this state arises. Accordingly, backup can be implemented without greatly reducing the voltage that is applied to the power path 81, even in the case where power supply from the power source unit 91 cuts out when the ignition switch is in the ON state, for instance.

Note that, in this specification, the case where a failure occurs in the power source unit 91 refers to the case where an anomaly occurs in power supply from the power source unit 91 (i.e., the case where power supply from the power source unit 91 is not in the normal state), and, specifically, refers to the case where the voltage (+B voltage) applied to the wiring part 83 is equal to or less than the threshold Vth. In this way, "the case where the voltage of the output-side conduction path 22 is higher than the voltage of the power path 81" will arise at least in the case where a failure occurs in the power source unit 91.

Next, the effects of this configuration will be illustrated.

With the backup device 1 shown in FIG. 1, when the power source unit 91 in the fully charged state or in a normal state approaching the fully charged state, the voltage that is applied to the output-side conduction path 22 by the discharging circuit 3B is lower than the voltage that is applied to the power path 81, and thus current is restricted by the diode 30 (element unit), and current does not flow from the output-side conduction path 22 to the power path 81. Accordingly, discharge from the power storage unit 7 can be suppressed when the power source unit 91 is in the fully charged state or in a normal state approaching the fully charged state.

On the other hand, in the case where power supply to the power path 81 from the power source unit 91 drops or stops for some reason and the voltage that is applied to the output-side conduction path 22 by the discharging circuit 3B becomes higher than the voltage that is applied to the power path 81, current flows from the output-side conduction path 22 to the power path 81 side. Therefore, even when a situation such as power supply to the power path 81 from the power source unit 91 dropping or stopping occurs, current that is based on the output of the power storage unit 7 can be immediately sent to the power path 81 via the output-side conduction path 22, and backup can be implemented very quickly. Moreover, even when the output voltage of the power storage unit 7 drops to some extent at the time of an anomaly on the power path 81, a desired voltage can be immediately applied to the power path 81 as long as the voltage that is applied to the output-side conduction path 22 under the control of the control unit 5 can be maintained at a target voltage.

In this way, the backup device 1 having this configuration is capable of switching the supply source to the power storage unit 7 without interrupting power supply to the load 93 (power supply target) even in the case where power supply from the power source unit 91 cuts out, and such a function can be realized with a simple configuration.

Also, the diode 30 is used as the element unit, and the diode 30 is configured to be electrically connected, at the anode, to the output-side conduction path 22, and to be electrically connected, at the cathode, to the power path 81.

With the backup device 1 constituted in this way, when the power source unit 91 is in the fully charged state or in a normal state approaching the fully charged state, the voltage that is applied to the output-side conduction path 22 by the discharging circuit 3B (i.e., anode-side voltage of the diode 30) is lower than the voltage that is applied to the power path 81 (i.e., cathode-side voltage of the diode 30), and thus flow of current from the output-side conduction path 22 to the power path 81 can be restricted. Also, in the case where power supply to the power path 81 from the power source unit drops or stops for some reason and the voltage that is applied to the output-side conduction path 22 by the discharging circuit 3B (anode-side voltage of the diode 30) becomes higher than the voltage that is applied to the power path 81 (cathode-side voltage of the diode 30), current can be immediately sent from the output-side conduction path 22 to the power path 81 via the diode 30. Also, such a function can be easily realized mainly through the action of the diode 30.

The backup device 1 has the charging circuit 3A that charges the power storage unit 7 based on power that is supplied from the power source unit 91. The control unit 5 causes the charging circuit 3A to perform the charging operation for charging the power storage unit 7 in response to a predetermined charge start condition being established (e.g., switching of the IG-OFF signal to the IG-ON signal), causes the discharging circuit 3B to perform voltage conversion such that the target voltage V2 is applied to the output-side conduction path 22 in the case where the output voltage of the power storage unit 7 is equal to or greater than the predetermined first threshold, and stops the charging operation of the charging circuit 3A in the case where the output voltage of the power storage unit 7 reaches the second threshold that is higher than the first threshold.

The backup device 1 constituted in this way is able to start voltage conversion by the discharging circuit 3B and enter a standby state (i.e., state in which backup can be implemented when power supply to the power path 81 from the power source unit drops or stops) even during the charging operation by the charging circuit 3A (before the output voltage reaches the second threshold) as long as the output voltage of the power storage unit 7 is equal to or greater than the first threshold. In other words, since the backup device 1 is able to enter the standby state at an early stage, the period for which backup is not implementable can be reduced.

Second Embodiment

Next, the backup device 1 of a second embodiment will be described.

Figure 3:
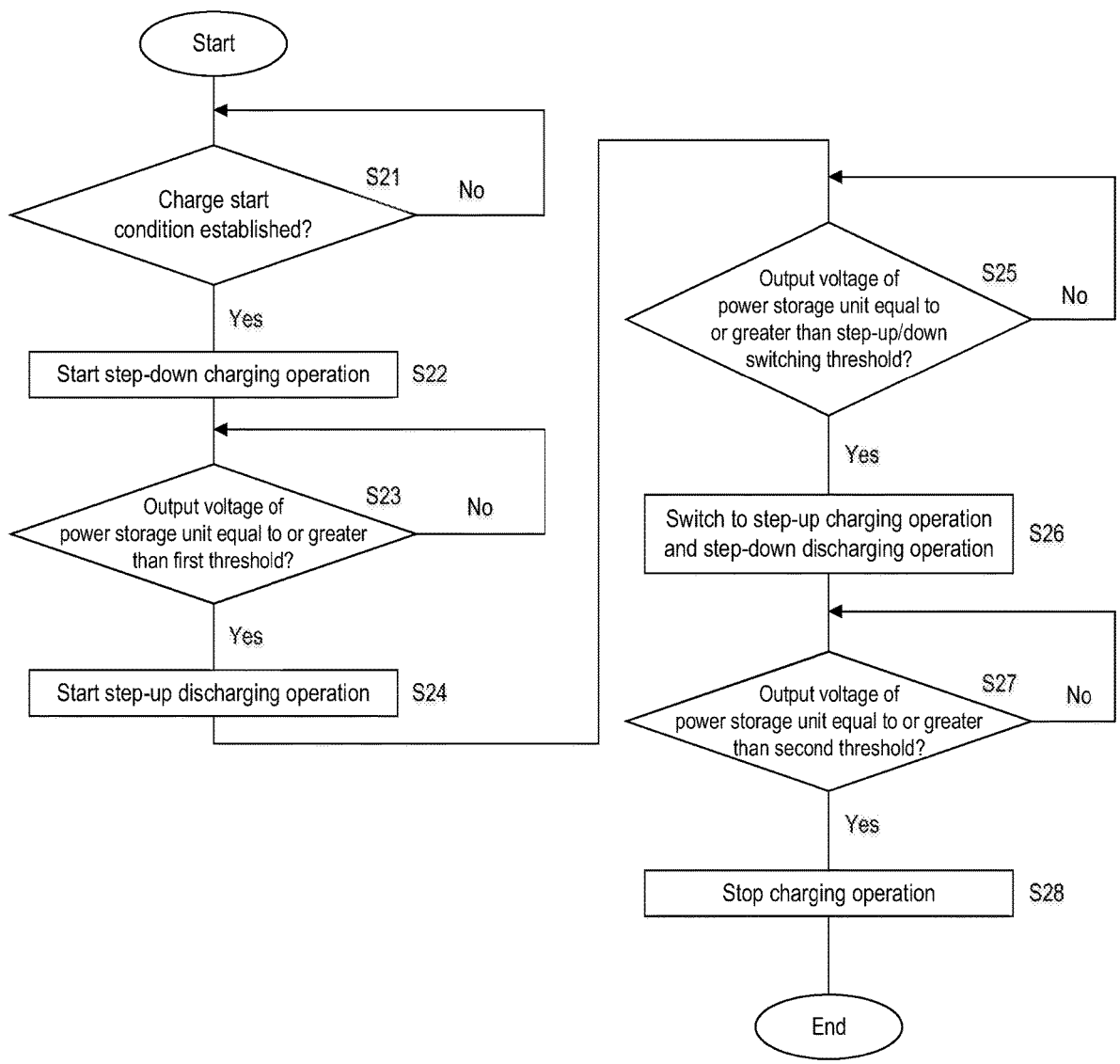
FIG. 3 is a flowchart illustrating the flow of charging control that is performed with the backup device of a second embodiment.

With the backup device 1 of the second embodiment, the relationship between the voltages of the power source unit 91 and the power storage unit 7 when fully charged differs from the first embodiment, with charging control changing from the control of FIG. 2 to the control of FIG. 3, and otherwise this backup device 1 is similar to the first embodiment. For example, the hardware configuration is similar to FIG. 1.

With the backup device 1 of the second embodiment, the output voltage of the power storage unit 7 when fully charged is higher than the output voltage of the power source unit 91 shown in FIG. 1 when fully charged. In other words, the second threshold is higher than the output voltage of the power source unit 91 when fully charged. Note that the first threshold is lower than the second threshold, and lower than the output voltage of the power source unit 91 when fully charged. Also, a step-up/down switching threshold described later is a value comparable with the output voltage of the power source unit 91 when fully charged, and the control unit 5 uses the output voltage of the power source unit 91 (e.g., voltage of the wiring part 83 that is detected) as the step-up/down switching threshold, for example.

Also, with this configuration, a step-up/down DC-DC converter can be used as the charging circuit 3A, for example, and a step-up/down DC-DC converter can also be used as the discharging circuit 3B. The charging circuit 3A and the discharging circuit 3B both have a function of stepping down and outputting a voltage that is input and a function of stepping up and outputting a voltage that is input, and which of these functions is executed is controlled by the control unit 5.

The backup device 1 of the second embodiment performs control with a flow such as shown in FIG. 3. FIG. 3 shows control that is executed by the control unit 5. The respective processing of steps S21 to S24 in FIG. 3 is similar to the respective processing of steps S1 to S4 in FIG. 2. Also, the respective processing of steps S27 and S28 is similar to the respective processing of steps S5 and S6 in FIG. 2.

The control unit 5 performs the respective processing of steps S21 to S24 similarly to steps S1 to S4 of FIG. 2, and continuously monitors the output voltage of the power storage unit 7 even after the discharging operation is started in step S24. Also, the control unit 5 continues the charge instruction signal to the charging circuit 3A even after starting the discharging operation in step S24, and continues to cause the charging circuit 3A to perform the charging operation. After step S24, the control unit 5 judges whether the output voltage of the power storage unit 7 is equal to or greater than the abovementioned step-up/down switching threshold (output voltage of the power source unit 91). If the output voltage of the power storage unit 7 is less than the step-up/down switching threshold (if No in step S25), the judgment of step S25 is repeated. In other words, the control unit 5 repeats the judgment of step S25 while continuously monitoring the output voltage of the power storage unit 7, until the output voltage of the power storage unit 7 becomes equal to or greater than the step-up/down switching threshold, and, during this period, continues control for causing the charging circuit 3A to perform the step-down charging operation started in step S22, and control for causing the discharging circuit 3B to perform the step-up discharging operation started in step S24. The control unit 5, if the output voltage of the power storage unit 7 becomes equal to or greater than the step-up/down switching threshold (if Yes in step S25), in step S26, switches control of the charging circuit 3A from control for causing the abovementioned step-down charging operation to be performed to control for causing a step-up charging operation to be performed (control for causing a step-up operation for stepping up and outputting the input voltage to be performed), and switches control of the discharging circuit 3B from control for causing abovementioned step-up discharging operation to be performed to control for causing a step-down discharging operation to be performed (control for causing a step-down operation for stepping down and outputting the input voltage to be performed).

The control unit 5, after switching control in step S26, continues control for causing the abovementioned step-up charging operation to be performed and control for causing the step-down discharging operation to be performed, while continuously monitoring the output voltage of the power storage unit 7, and judges whether the output voltage of the power storage unit 7 is equal to or greater than a predetermined second threshold. If the output voltage of the power storage unit 7 is less than the second threshold (if No in step S27), the judgment of step S27 is repeated. In other words, the control unit 5 repeats the judgment of step S27 while continuously monitoring the output voltage of the power storage unit 7, until the output voltage of the power storage unit 7 becomes equal to or greater than the second threshold, and, if the output voltage of the power storage unit 7 becomes equal to or greater than the second threshold (if Yes in step S27), causes the charging circuit 3A to stop the charging operation in step S28. Note that the second threshold is a higher than the abovementioned first threshold, and, in this example, is higher than the output voltage of the power source unit 91 when fully charged.

Note that, similarly, with the configuration of the second embodiment, discharging control need only be continued until the ignition switch changes to the OFF state, for example, after discharging control on the discharging circuit 3B is started in step S24 of the charging control shown in FIG. 3. Even with such a configuration of the second embodiment, similar effects to the first embodiment are obtained, and, for example, backup can be quickly implemented in the case where power supply from the power source unit 91 cuts out during discharging control.

Other Embodiments

The present disclosure is not limited to the first and second embodiments illustrated by the above description and drawings, and embodiments such as the following, for example, are also included in the technical scope of the present disclosure.

In the abovementioned first embodiment, a lead battery is used for the power source unit 91, but the present disclosure is not limited to this configuration, and, in any of the examples in this specification, another power source means (another well-known power generation means, power storage means, etc., such as a lithium-ion battery) may be used for the power source unit 91 instead of a lead battery or together with a lead battery. The number of power source means constituting the power source unit 91 is not limited to one, and the power source unit 91 may be constituted by a plurality of power source means.

Although, in the abovementioned first embodiment, an electric double-layer capacitor (EDLC) is used for the power storage unit 7, the present disclosure is not limited to this configuration, and, in any of the examples in this specification, another power storage means such as a lithium-ion battery, a lithium-ion capacitor or a nickel-metal hydride battery may be used for the power storage unit 7. Also, the number of power storage means constituting the power storage unit 7 is not limited to one, and the power storage unit 7 may be constituted by a plurality of power storage means.

Although, in the abovementioned first embodiment, the diode 30 is used as the element unit, a configuration may be adopted in which, for example, a MOSFET is used, with the anode of a parasitic diode of the MOSFET being electrically connected to the output-side conduction path 22 and the cathode of the parasitic diode being electrically connected to the power path 81. In this case, the control unit 5 may perform control to turn on the MOSFET if an anomaly in the power supply from the power source unit 91 is detected (e.g., if it is detected that the voltage of the wiring part 83 is equal to or less than an anomaly threshold). Note that, in this case, the control unit 5 need only perform control to turn off the MOSFET, if an anomaly in the power supply from the power source unit 91 is not detected (e.g., if it is detected that the voltage of the wiring part 83 exceeds the anomaly threshold).

In the abovementioned first embodiment, a configuration may be adopted in which, for example, the output voltage of the power storage unit 7 is maintained at a voltage that is lower than the first threshold, when the ignition switch is in the OFF state. In this case, after the ignition switch switches to the ON state, the step-down charging operation is carried out for a certain amount of time. Also, a configuration may be adopted in which, for example, the output voltage of the power storage unit 7 is maintained at a comparable voltage to the first threshold or a higher voltage than the first threshold. In this case, after the ignition switch switches to the ON state, the step-down charging operation can be omitted, and the discharging operation start of step S4 can be quickly executed.

The invention claimed is:

1. A backup device in a vehicle-mounted power source system that includes a power source unit configured to supply power to a power supply target, a power path serving as a path for supplying power from the power source unit to the power supply target, and a power storage unit serving as a power supply source at least when power supply from the power source unit cuts out, the backup device comprising:
   a charging and discharging unit having a charging circuit and a discharging circuit, the charging circuit configured to step-up or step-down a voltage applied to a power storage unit-side conduction path serving as a discharging path from the power storage unit and apply a resulting voltage to an output-side conduction path;
   a control unit configured to control the discharging circuit to apply, to the output-side conduction path, a predetermined target voltage that is lower than a voltage that is applied to the power path when the power source unit is fully charged; and
   an element unit provided between the power path and the output-side conduction path, and configured to restrict flow of current from the output-side conduction path to the power path in a case where the voltage of the output-side conduction path is lower than the voltage of the power path, and to allow flow of current from the output-side conduction path to the power path side in a case where the voltage of the output-side conduction path is higher than the voltage of the power path, wherein the control unit:

causes the charging circuit to perform a charging operation for charging the power storage unit in response to a predetermined charge start condition being established, causes the discharging circuit to perform voltage conversion such that the predetermined target voltage is applied to the output-side conduction path in a case where an output voltage of the power storage unit is equal to or greater than a predetermined first threshold, wherein the predetermined first threshold is a value obtained by subtracting a forward voltage of the element from the predetermined target voltage, and stops the charging operation of the charging circuit in a case where the output voltage of the power storage unit reaches a second threshold, the second threshold being higher than the predetermined first threshold, and stops the charging operation of the charging circuit in a case where the voltage of a wiring part that is electrically connected to the power source unit and disposed between the power source unit and the power path becomes equal to or less than the predetermined first threshold.

2. The vehicle-mounted backup device according to claim 1, wherein the element unit includes a diode electrically connected, at an anode, to the output-side conduction path, and electrically connected, at a cathode, to the power path.

3. The vehicle-mounted backup device according to claim 2, wherein the case where the voltage of the output-side conduction path is higher than the voltage of the power path arises at least in a case where a failure occurs in the power source unit.

4. The vehicle-mounted backup device according to claim 1, wherein the case where the voltage of the output-side conduction path is higher than the voltage of the power path arises at least in a case where a failure occurs in the power source unit.

* * * * *